(12) United States Patent
Zhang et al.

(10) Patent No.: US 8,468,654 B2
(45) Date of Patent: Jun. 25, 2013

(54) HINGE ASSEMBLY AND ELECTRONIC DEVICE USING THE SAME

(75) Inventors: Han-Zheng Zhang, Shenzhen (CN); Xiao-Bo Li, Shenzhen (CN); Shen Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 279 days.

(21) Appl. No.: 12/915,275

(22) Filed: Oct. 29, 2010

(65) Prior Publication Data
US 2011/0254419 A1 Oct. 20, 2011

(30) Foreign Application Priority Data

Apr. 20, 2010 (CN) .......................... 2010 1 0151331

(51) Int. Cl.
*E05C 17/64* (2006.01)
(52) U.S. Cl.
USPC ............ 16/342; 16/341; 16/386; 361/679.27; 403/281
(58) Field of Classification Search
USPC ................... 16/337, 341, 342, 254, 270, 380, 16/386; 379/433.13; 361/679.27; 455/575.3; 403/277, 281
See application file for complete search history.

(56) References Cited

U.S. PATENT DOCUMENTS

| | | | | |
|---|---|---|---|---|
| 1,847,937 A * | 3/1932 | Fetters | ............................ | 16/339 |
| 5,333,356 A * | 8/1994 | Katagiri | .......................... | 16/340 |
| 5,715,576 A * | 2/1998 | Liu | ................................. | 16/342 |
| 5,915,440 A * | 6/1999 | Repo | .............................. | 16/330 |
| 6,381,808 B1 * | 5/2002 | Kida | .............................. | 16/340 |
| 7,003,852 B2 * | 2/2006 | Wen-Pin | ........................ | 16/342 |
| 8,024,841 B2 * | 9/2011 | Shen | .............................. | 16/341 |
| 8,082,627 B2 * | 12/2011 | Chien | ............................ | 16/342 |
| 2007/0214605 A1* | 9/2007 | Tu | .................................. | 16/342 |

FOREIGN PATENT DOCUMENTS

| | | |
|---|---|---|
| CN | 2270139 Y | 12/1997 |
| CN | 200958525 Y | 10/2007 |
| CN | 201636196 U | 11/2010 |

* cited by examiner

*Primary Examiner* — William L. Miller
(74) *Attorney, Agent, or Firm* — Altis Law Group, Inc.

(57) ABSTRACT

An embodiment of a hinge assembly includes a main body defining a shaft hole, a connecting shaft including an inserting end rotatably received in the shaft hole, and an expansion member forming a tapered portion and axially positioned in the shaft hole. An end surface of the inserting end toward the expansion member defines a tapered hole corresponding to the tapered portion, and the tapered portion is pressed into the tapered hole to expand the inserting end to resist the inner surface of the shaft hole, thus rotatably connecting the connecting shaft to the main body.

12 Claims, 4 Drawing Sheets

HINGE ASSEMBLY AND ELECTRONIC DEVICE USING THE SAME

BACKGROUND

1. Technical Field

The present disclosure generally relates to a hinge assembly and an electronic device using the hinge assembly.

2. Description of Related Art

A commonly used hinge assembly generally includes a main body and a connecting shaft. The main body defines a shaft hole, and the connecting shaft is rotatably received in the shaft hole. When the hinge assembly is used in an electronic device which includes a base and a lid, the main body of the hinge assembly is fixed to the base of the electronic device, and the connecting shaft is fixed to the lid, thus hinging the lid on the base.

The connecting shaft generally forms a plurality of knurled structures on an outer surface of an inserting end, and the external diameter of the inserting end slightly exceeds the inner diameter of the shaft hole. During assembly of the hinge assembly, the inserting end is pressed into and interference fit with the shaft hole, thus coupling the connecting shaft to the main body. In use, when an external force applied to the connecting shaft or the main body exceeds the friction force between the connecting shaft and the shaft hole, the connecting shaft is rotated relative to the main body. However, a significant amount of pressure is required to deform the inserting end into the shaft hole, thus it is difficult to assemble. In addition, the inner surface of the shaft hole will be unduly damaged by the knurled structures of the connecting shaft when the inserting end is pressed into the shaft hole, thus reducing the lifetime of the hinge assembly.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
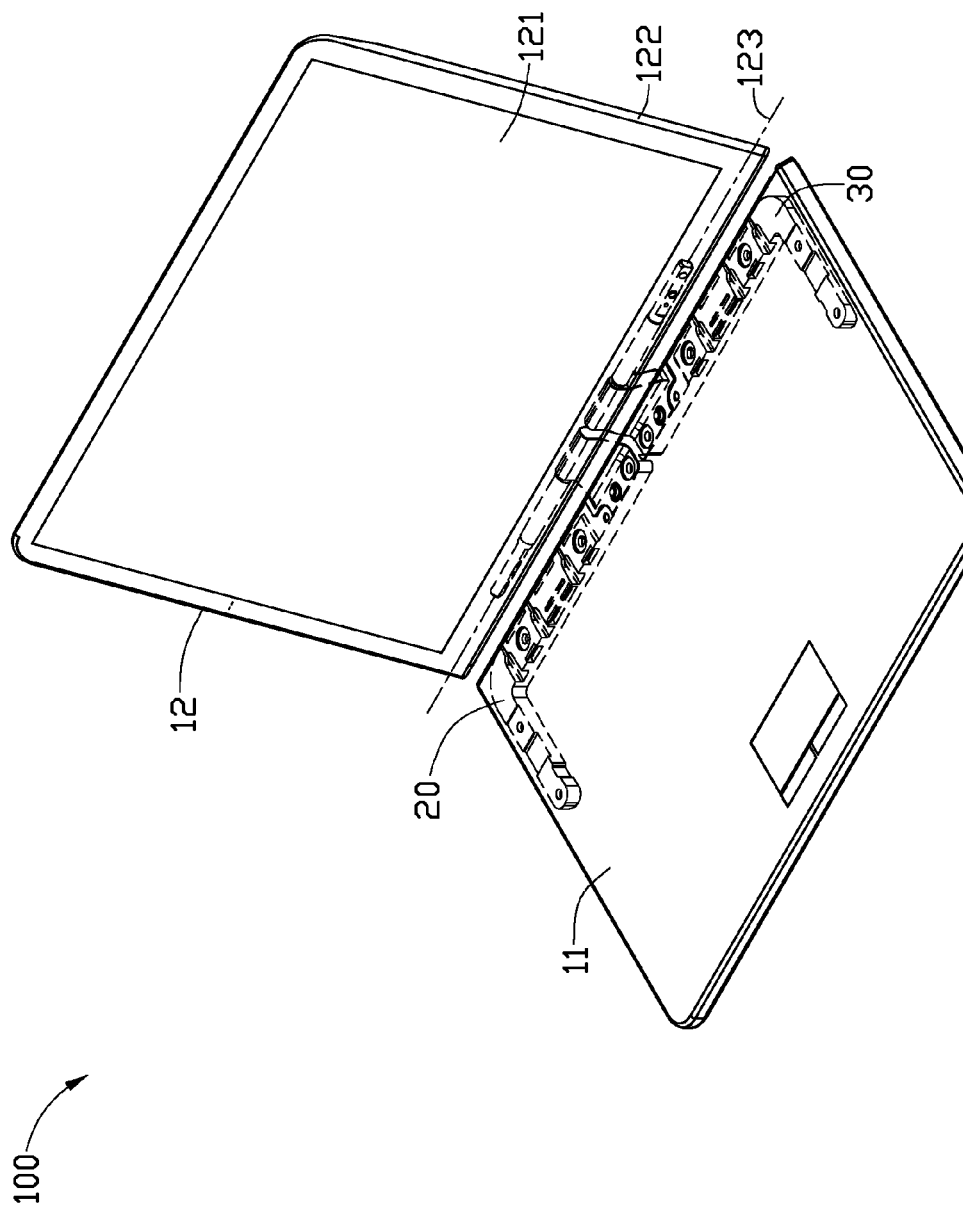
FIG. 1 is an isometric, assembled view of one embodiment of an electronic device.

Referring to FIG. 1, one embodiment of an electronic device 100 includes a base 11 housing various internal and external components for operating the electronic device 100 and a lid 12, which includes a display screen 121 seated in a housing 122. The lid 12 hinges on the base 11 via a first hinge assembly 20 and a second hinge assembly 30. The first and second hinge assemblies 20, 30 allow the lid 12 to pivot relative to the base 11 around a rotation axis 123, thereby allowing adjustment of the orientation of the lid 12 relative to the base 11.

As illustrated in FIG. 1, the first and second hinge assemblies 20, 30 are positioned between the base 11 and the lid 12, and symmetric about a central longitudinal plane of the base 11. The first and second hinge assemblies 20, 30 have similar structures, thus taking the first hinge assembly 20 as an illustrative example in the following.

Figure 2:
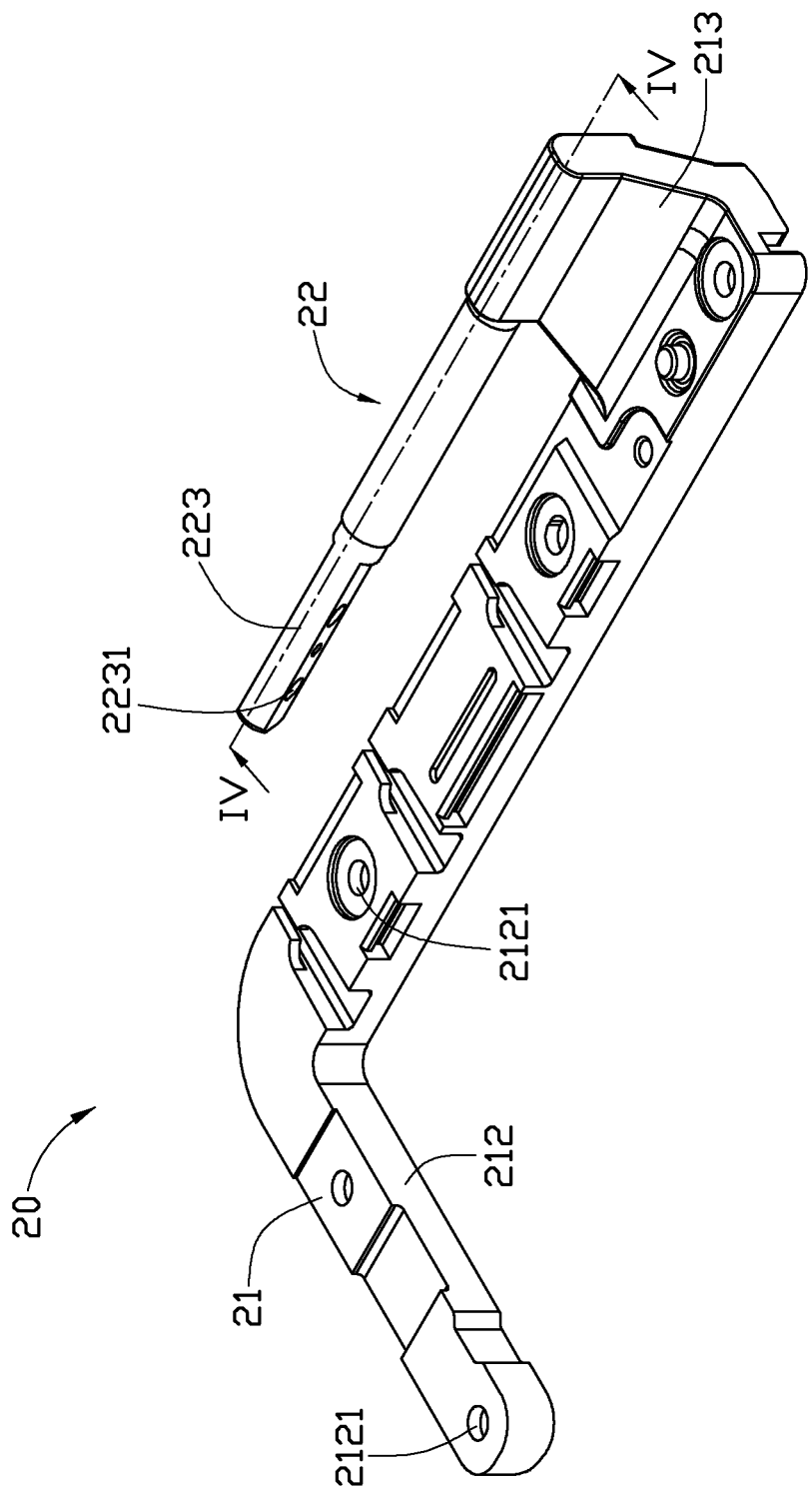
FIG. 2 is an isometric, assembled view of one embodiment of a hinge assembly used with an electronic device, such as, for example the electronic device of FIG. 1.
Figure 3:
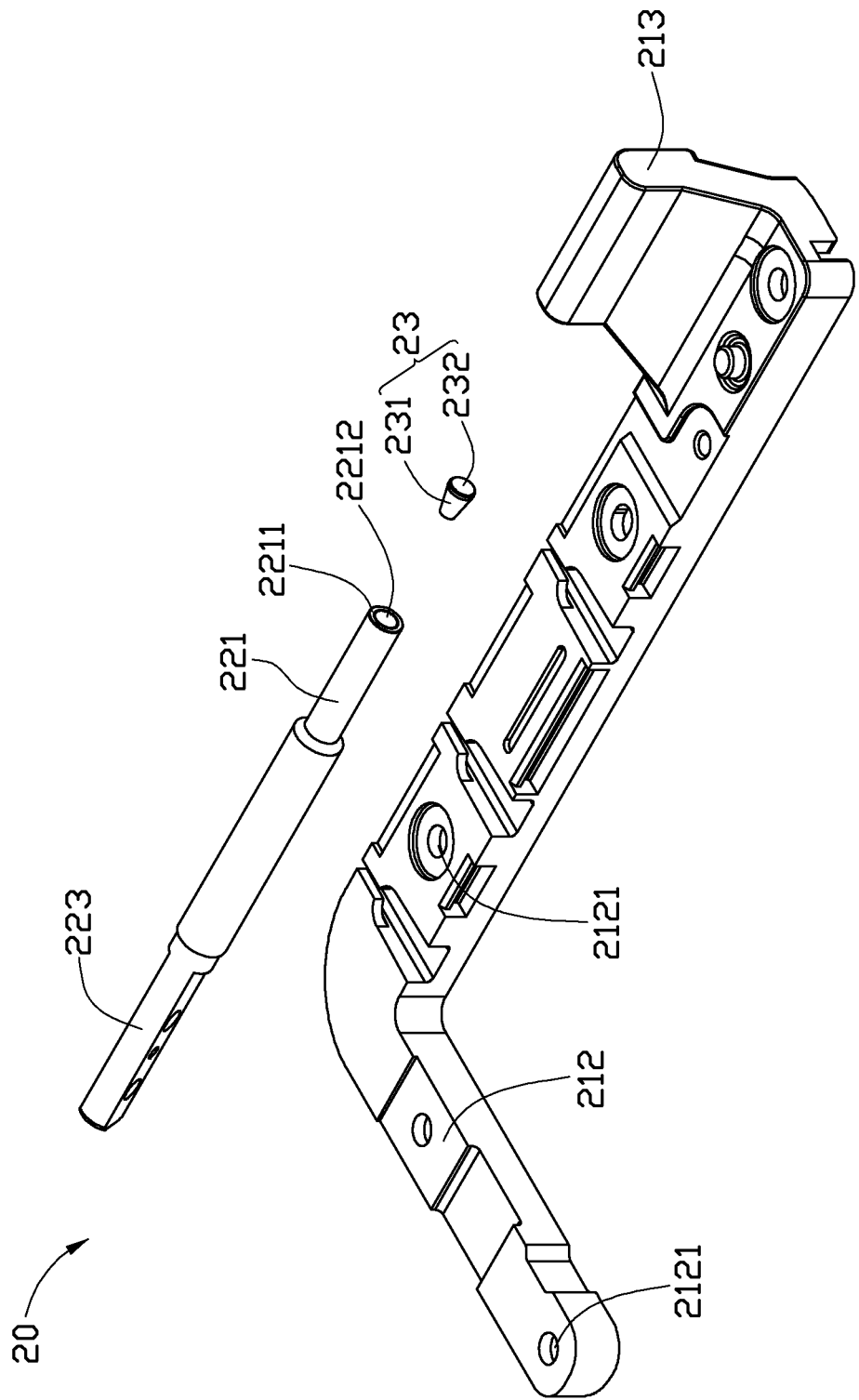
FIG. 3 is an exploded, isometric view of the hinge assembly of FIG. 2.
Figure 4:
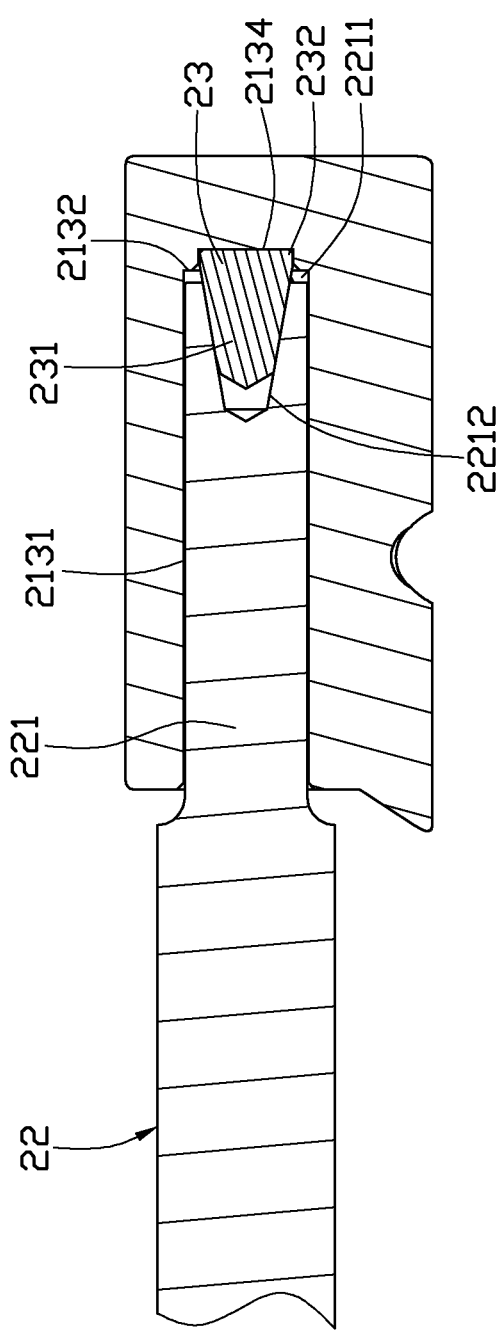
FIG. 4 is a cross-section taken along line IV-IV in FIG. 2.

Referring to FIGS. 2 through 4, the first hinge assembly 20 includes a main body 21, a connecting shaft 22, and an expansion member 23. The main body 21 is secured to the base 11, and the connecting shaft 22 is secured to the housing 122 of the lid 12.

In one embodiment, the main body 21 includes a first connecting portion 212 and a second connecting portion 213 integrally formed with the first connecting portion 212. The first connecting portion 212 is substantially L-shaped, and the second connecting portion 213 extends from an end of the first connecting portion 212. The first connecting portion 212 defines a plurality of first mounting holes 2121 for fixing the main body 21 to the base 11. The second connecting portion 213 defines a shaft hole 2131 for receiving the connecting shaft 22. In the illustrated embodiment, the shaft hole 2131 is a blind hole extending from a free end surface of the second connecting portion 213. The bottom surface 2132 of the shaft hole 2131 defines a positioning groove 2134 in the central portion of the bottom surface 2132. The main body 21 may be formed by die casting.

The connecting shaft 22 includes an inserting end 221 and a connecting end 223. The inserting end 221 is substantially cylindrical with an external diameter less than the inner diameter of the shaft hole 2131, such that the inserting end 221 can be easily received in the shaft hole 2131. An end surface 2211 of the inserting end 221 defines a tapered hole 2212 extending axially. The tapered hole 2212 is coaxial with the inserting end 221. The inner diameter of the tapered hole 2212 decreases gradually in the axial direction thereof toward the bottom of the tapered hole 2212. The connecting end 223 is substantially flat and defines a plurality of second mounting holes 2231 for fixing the connecting shaft 22 to the lid 12.

The expansion member 23 includes a tapered portion 231 corresponding to the tapered hole 2212 of the connecting shaft 22, and a positioning portion 232 formed on the end having a larger diameter. The positioning portion 232 corresponds to the positioning groove 2134, for axially positioning the expansion member 23 in the shaft hole 2131.

To assemble the first hinge assembly 20, the expansion member 23 is axially positioned in the positioning groove 2134. The inserting end 221 of the connecting shaft 22 is received in the shaft hole 2131 and coupled to the expansion member 23 via the engagement of the tapered portion 231 and the tapered hole 2212. The connecting shaft 22 is pressed into the shaft hole 2131 by external axial pressure. The tapered portion 231 of the expansion member 23 is gradually received in the tapered hole 2212, so that the inserting end 221 generates radial deformation and expands, thus making the circumferential surface of the inserting end 221 resists the inner surface of the shaft hole 2131 and couples the connecting shaft 22 to the main body 21. When the connecting shaft 22 is positioned in the shaft hole 2131, the connecting shaft 22 can be precisely coaxial with the shaft hole 2131 via the engagement of the tapered portion 231 and the tapered hole 2212. During the assembly of the first hinge assembly 20, the inserting end 221 is received in the shaft hole 2131 without scratching the inner surface of the shaft hole 2131, thus the lifetime of the first hinge assembly 20 can be prolonged. Furthermore, the assembly of the first hinge assembly 20 is thereby simplified.

In use, when an external force applied to the connecting shaft 22 exceeds the friction force between the connecting shaft 22 and the main body 21, the connecting shaft 22 rotates relative to the main body 22 about the central axis thereof. Thus, when the external force applied to the lid 12 of the electronic device 100 is enough to overcome the friction force generated by the first and second hinge assemblies 20, 30, the lid 12 can be rotated relative to the base 11.

While the disclosure has been described in terms of preferred embodiments, there are alterative permutations, and equivalents, which fall with the scope of this invention. For example, the electronic device 100 can utilize instead only one hinge assembly, for example, the first hinge assembly 20 or the second hinge assembly 30.

The invention claimed is:

1. A hinge assembly comprising:
a main body;
a connecting shaft comprising an inserting end rotatably received in the shaft hole; and
an expansion member forming a tapered portion and axially positioned in the shaft hole;
wherein the main body comprises a first connecting portion and a second connecting portion integrally formed with the first connecting portion, the second connecting portion extending from an end of the first connecting portion, the first connecting portion being substantially L-shaped, the second connecting portion defining a shaft hole having an inner surface, an end surface of the inserting end toward the expansion member defines a tapered hole corresponding to the tapered portion, and the tapered portion is pressed into the tapered hole to expand the inserting end to resist the inner surface of the shaft hole, thus rotatably connecting the connecting shaft to the main body.

2. The hinge assembly of claim 1, wherein the shaft hole is a blind hole.

3. The hinge assembly of claim 1, wherein the first connecting portion defines a plurality of first mounting holes, and the connecting shaft defines a plurality of second mounting holes.

4. The hinge assembly of claim 1, wherein the inserting end is substantially cylindrical, an external diameter of the inserting end is appreciably less than an inner diameter of the shaft hole.

5. The hinge assembly of claim 1, wherein a bottom surface of the shaft hole defines a positioning groove, and the expansion member comprising a positioning portion corresponding to the positioning groove.

6. An electronic device comprising:
a base; and
a lid pivotally connected to the base via at least one hinge assembly, the at least one hinge assembly comprising:
a main body defining a shaft hole and secured to the base, the shaft hole having an inner surface;
a connecting shaft having an inserting end rotatably received in the shaft hole and secured to the lid; and
an expansion member forming a tapered portion and axially positioned in the shaft hole;
wherein an end surface of the inserting end toward the expansion member defines a tapered hole corresponding to the tapered portion, and the tapered portion is pressed into the tapered hole to expand the inserting end to resist the inner surface of the shaft hole, thus rotatably connecting the connecting shaft to the main body.

7. The electronic device of claim 6, wherein the at least one hinge assembly comprises two hinge assemblies positioned between the base and the lid, and substantially symmetric about a central longitudinal plane of the base.

8. The electronic device of claim 6, wherein the main body comprises a first connecting portion and a second connecting portion integrally formed with the first connecting portion; wherein the first connecting portion is substantially L-shaped, and the second connecting portion substantially extends from an end of the first connecting portion.

9. The electronic device of claim 8, wherein the first connecting portion defines a plurality of first mounting holes for fixing the main body to the base, and the connecting shaft defines a plurality of second mounting holes for fixing the connecting shaft to the lid.

10. The electronic device of claim 6, wherein the main body is formed by die casting.

11. The electronic device of claim 6, wherein the inserting end is substantially cylindrical with an external diameter appreciably less than an inner diameter of the shaft hole.

12. The electronic device of claim 6, wherein a bottom surface of the shaft hole defines a positioning groove, and the expansion member comprising a positioning portion corresponding to the positioning groove.

* * * * *